FIG. 3

| DATA KEYS: | KB6 | KB5 | KB4 | KB3 | KB2 | KB1 |
|---|---|---|---|---|---|---|
| Ø | 1 | 0 | 0 | 0 | 1 | 1 |
| 1 | 1 | 0 | 0 | 1 | 0 | 0 |
| 2 | 1 | 0 | 0 | 1 | 0 | 1 |
| 3 | 1 | 0 | 0 | 1 | 1 | 0 |
| 4 | 1 | 0 | 0 | 1 | 1 | 1 |
| 5 | 1 | 0 | 1 | 0 | 0 | 0 |
| 6 | 1 | 0 | 1 | 0 | 0 | 1 |
| 7 | 1 | 0 | 1 | 0 | 1 | 0 |
| 8 | 1 | 0 | 1 | 0 | 1 | 1 |
| 9 | 1 | 0 | 1 | 1 | 0 | 0 |
| **FUNCTION KEYS:** | | | | | | |
| MULTIPLICAND | 1 | 1 | 0 | 0 | 1 | 0 |
| DIVISOR | 1 | 1 | 0 | 0 | 1 | 1 |
| CORRECT | 1 | 1 | 0 | 1 | 0 | 0 |
| CLEAR | 1 | 1 | 0 | 1 | 0 | 1 |
| STORE IN | 1 | 1 | 0 | 1 | 1 | 0 |
| STORE OUT | 1 | 1 | 0 | 1 | 1 | 1 |
| TOTAL | 1 | 1 | 1 | 0 | 0 | 0 |
| SUB-TOTAL | 1 | 1 | 1 | 0 | 0 | 1 |
| MULTIPLIER (NEG) | 1 | 1 | 1 | 0 | 1 | 0 |
| MULTIPLIER (POS) | 1 | 1 | 1 | 0 | 1 | 1 |
| SUBTRACT | 1 | 1 | 1 | 1 | 0 | 0 |
| ADD | 1 | 1 | 1 | 1 | 0 | 1 |
| NON-ADD | 1 | 1 | 1 | 1 | 1 | 0 |
| DIVIDEND | 1 | 1 | 1 | 1 | 1 | 1 |

United States Patent Office 3,430,226
Patented Feb. 25, 1969

3,430,226

CALCULATORS

Allan I. Chow, Jamestown, and James F. Milne, Penfield, N.Y., assignors to Sperry Rand Corporation, New York, N.Y., a corporation of Delaware Filed May 5, 1965, Ser. No. 455,037
U.S. Cl. 340—347 15 Claims
Int. Cl. H04l *3/00;* G06c *7/02*

ABSTRACT OF THE DISCLOSURE

A keyboard comprising a plurality of manually operable keys. Each key is provided with an actuating member having cutout portions representative of a number in a desired code. A plurality of cranks are disposed to operate a plurality of switches respectively. Each actuating member serves to actuate one or more cranks depending on the arrangement of the cutout portions. The combination of operated and non-operated switches give the coded representation of the key depressed.

The present invention relates in general to calculators and the like, and more particularly to a keyboard decoder mechanism for generating a binary coded electrical output from a manually operated keyboard input.

The invention particularly provides a keyboard mechanism such as used in typewriters, calculators and other devices wherein information or commands are inserted into the device to effect, through mechanical or electrical control, a selected operation or function provided by the device. The mechanism of the instant invention relates to an electronic calculator capable of performing a full range of arithmetic operations through logical manipulation of binary coded decimal numbers in the form of electrical signals in the Excess-3 binary code.

The preferred embodiment of the invention therefore provides a keyboard having one or more groups of manually operated keys capable upon depression of directly generating an electrical output in the Excess-3 binary code representative of the particular key depressed. Each key is provided with an actuating member having cutout portions representative of an Excess-3 binary coded number associated with the particular key, the actuating member serving to actuate one or more cranks of a set depending on the arrangement of the cutout portions. Since actuation or non-actuation of the cranks can be representative of the binary conditions zero or one, detection of the crank operation by a reed switch associated with each crank will produce binary coded signals representative of the cutout distribution on the given actuating member unique to the key depressed.

It is an object of the instant invention to provide a keyboard mechanism for generating a binary coded electrical output from a manually operated keyboard input.

It is another object of the instant invention to provide a keyboard mechanism capable of directly generating electrical signals in an Excess-3 binary code in response to and representative of a depressed key.

It is a further object of the instant invention to provide a keyboard mechanism capable of generating an electrical output in response to a manually operated keyboard input which is of low cost and very dependable in operation.

It is still another object of the instant invention to provide a keyboard mechanism capable of generating an electrical output which utilizes electrical components of high reliability and relatively low cost.

It is still a further object of the instant invention to provide a keyboard mechanism for generating a binary coded electrical output in response to key actuation and capable of automatically synchronizing the transmission of said binary coded data by relatively simple means.

These and other objects, features, and advantages of the present invention will become more obvious from the following description when taken in connection with the accompanying drawing which shows, for purposes of illustration only, an embodiment in accordance with the instant invention, and wherein:

FIGURE 3 is a chart setting forth an example of a binary code which may be utilized with the keyboard of FIGURE 2;

Figure 1:
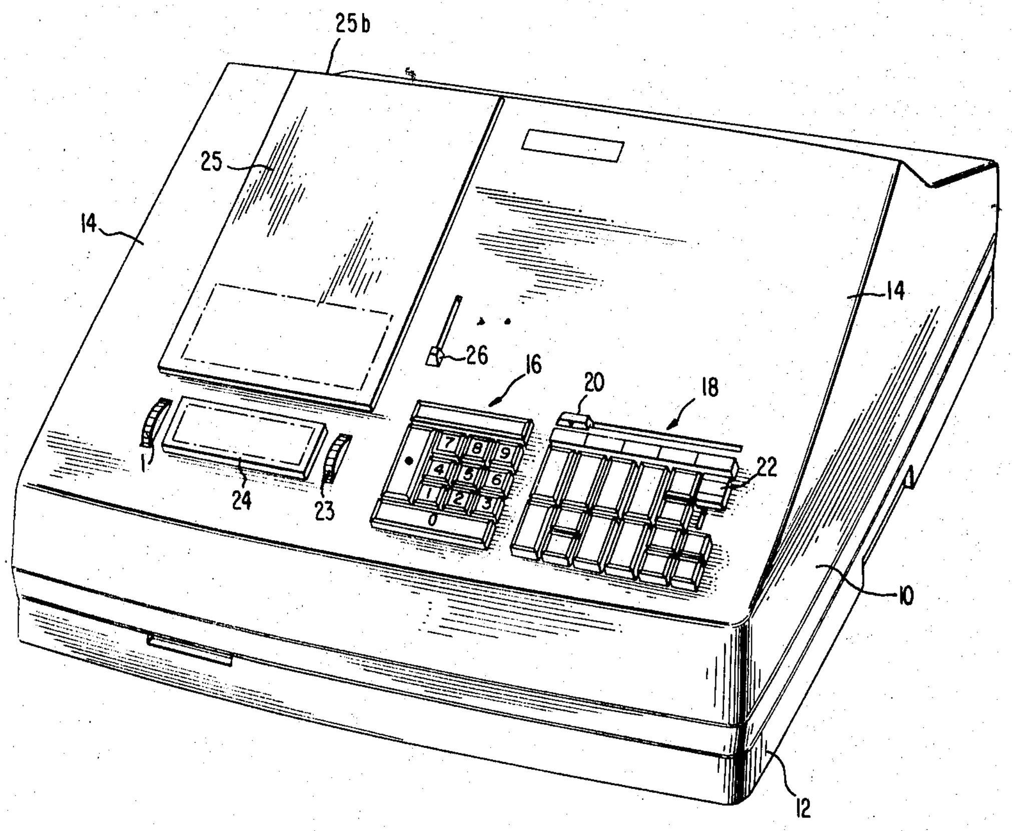
FIGURE 1 is a perspective view of a calculator in which the keyboard mechanism of the instant invention may be used.

An embodiment of the electronic desk calculator with which the keyboard of the instant invention may be used is illustrated in FIGURE 1 and includes a casing or cover 10 which is mounted upon and locked to the base 12 of the machine in any conventional manner subject to easy removal so as to effectively isolate the internal mechanism of the calculator during normal operation from outside contact and accidental damage. The inclined front panel or keyboard 14 is divided into four general areas which provide keys, indicators, and other elements necessary to the operation of the calculator. Each of the keys provided by the calculator are positioned on the keyboard at a location which is most accessible and natural for ease of operation of the device.

The keyboard 14 provides a plurality of data entry keys in the form of a ten key arrangement generally designated 16 in FIGURE 1. To the right of the data entry keys 16 on the keyboard 14 there is provided a group of keys consisting of list keys, calculator keys and various non-arithmetic keys generally designated 18 through which selective operation upon the data entered through the data entry keys 16 is initiated.

Immediately above the group of keys 18 on the keyboard there is provided a second-accumulator control lever 20 through which the calculator may be set to automatically accumulate totals, products and quotients within a second accumulator. The accumulator control 20 is complemented by control lever 22 included in the group of keys 18. The control lever 22 serves to select between primary use of a main accumulator or the auxiliary accumulator included within the main memory of the calculator logic system. Through proper setting of the control levers 20 and 22 a plurality of selective functions may be performed by the calculator materially increasing the versatility of the device over presently known devices of a much more complicated nature.

At the extreme left-hand portion of the keyboard 14 there is provided a decimal point selector control 23 and a column indicator dial 24 which serve to set the maximum number of decimal places and indicate the number of digits entered into the memory, respectively. Above the column selector dial 24 on the keyboard 14 there is provided a window arrangement 25 beneath which the paper tape, upon which the data introduced into the calculator and the results of the arithmetic operations are printed by an appropriate printer, is passed out of the machine being visible through the window 25 for each line that is printed. A control lever 26 to one side of the window 25 provides for manual paper advance allowing the paper to be advanced beyond the upper edge 25b of the window 25, where it may be pulled out and torn off.

Figure 2:
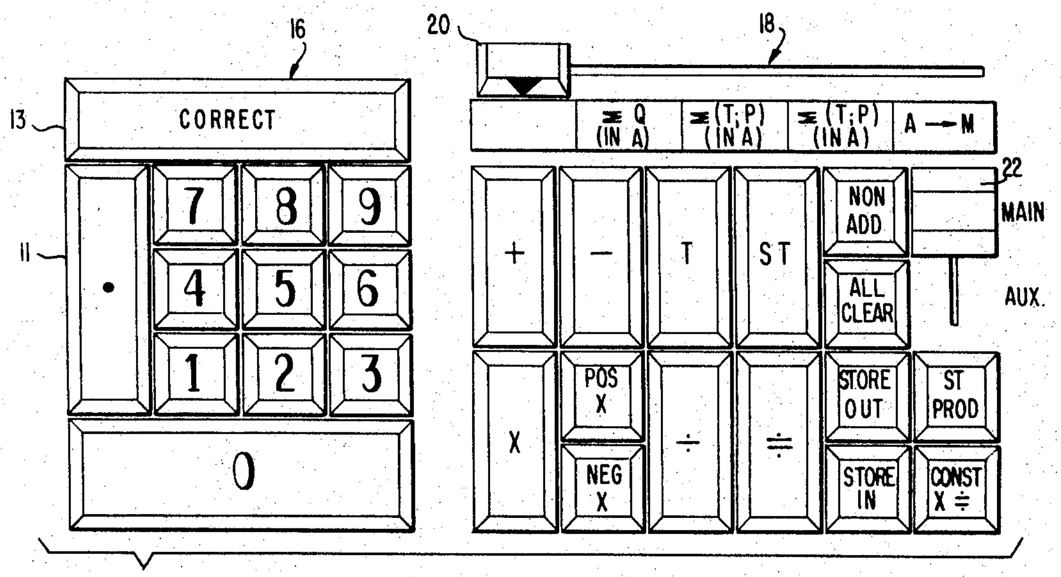
FIGURE 2 is a detail plan view of the keyboard on the calculator illustrated in FIGURE 1.

Looking more in detail to the keys 16 and 18 provided on the keyboard 14, particularly with regard to the introduction of data into the associated machine through the keys 16 and the initiation and control of machine operation through the keys and controls 18, as seen in FIGURE 2, data entry is achieved through ten numeric keys 0–9 and a decimal key 11. Depression of a numeric key causes the digit to enter into the least significant digit location in the input register of the calculator main memory in the form of an appropriate four bit binary number. Subsequent depressions of any numeric key shifts the previous entry to the next higher digit location within the input register and enters the value of the last key depressed into the least significant digit location of that register. Depression of the decimal key indicates that subsequent depressions of any numeric key will be to the right of the decimal point, i.e., the decimal key indicates the separation between the least significant integer and the most significant decimal.

A correction key 13 is also provided among the group of keys 16, which key generates a correction signal clearing the input register of the main memory.

Among the group of keys 18 there is provided several list keys which initiate the list problems including addition (+), subtraction (−), total (T), and subtotal (ST). These list problems may be carried out in either the main accumulator or the auxiliary accumulator of the main memory by selecting one or the other accumulator via control lever 22.

Depression of the add key "+" causes the number in the input register to be added in a positive manner to the main or the auxiliary accumulator depending upon the setting of control lever 22. In a like manner, depression of the subtract key "—" causes the number in the input register to be added to the main or auxiliary accumulator in a negative manner.

Depression of the "total" control causes the number accumulated in the main or auxiliary accumulator to be transferred to the printing mechanism for printing; the accumulator is then left in a cleared condition; and 13 digits of the accumulated number aligned around the decimal point are transferred to the input register. Depression of the "SubTot" control performs the same function as the total control with the exception that the accumulator is not cleared after the operation.

Also included in the group of keys 18 are a plurality of calculator keys for performing various multiplication and division operations. Depression of the multiplicand (×) key causes the number in the input register to be printed and entered in to a multiplicand and divisor (MD) register in the calculator main memory. The multiplication process is then completed by depression of either the multiplier (POS) or the multiplier (NEG) controls. Depression of the multiplier (POS) control automatically starts the multiplication process by successively adding the multiplicand in the MD register to the main accumulator in accordance with the multiplier present in the input register of the main memory. The multiplier NEG. control is similar to that of the multiplier POS. control except that the multiplication is carried out in a negative manner. A subtotal product may be printed at any time prior to depression of the multiplier key through depression of the subtotal product (ST.PROD.) which effects a printing of the subtotal product and prevents the main accumulator from being cleared. A dividend entry key (÷) is provided for effecting a printing of the number in the input register and adding this number to the main accumulator. The depression of the divisor key (÷) then automatically starts the division process causing a printing of the number in the input register and transfer of that number to the MD register. The quotient is then developed in the input register and at the end of the division process the remainder in the main accumulator will be printed followed by a printing of the quotient.

Within the group of keys 18 there is provided a constant multiplicand or division key (CONST × ÷), depression of which causes the last multiplicand to be locked into the MD register. Any attempt thereafter to enter a new multiplicand with the constant multiplicand key in the down position will be ignored and the new number destroyed. If it is desired to lock in a constant divisor, the constant multiplicand or divisor key must be depressed prior to the subsequent depression of the divisor key.

A plurality of keys for initiating non-arithmetic functions are also provided within the group of keys 18. Depression of the "non-add" key causes the number in the input register to be printed; however, the number remains in the input register after the non-add operation. As a complement to the correction key in the data entry section 16, there is provided in the group of keys 18 an "all-clear" key which causes all registers and accumulators in the calculator to clear, and prints an all-clear symbol on the paper tape. The entire calculator is cleared in this one operation.

Included in the main memory is a store register which is controlled by the "Store in" and "Store out" keys on the keyboard 14. Depression of the "store in" key causes a number in the input register to be transferred to the storage register while the number also remains in the input register. In a like manner, depression of the "store out" key brings the number from the storage register to the input register, however, leaving this number also in the storage register until a new number is stored in or until the machine is cleared.

The basic conversion of decimal numbers and the above-exemplified commands into binary coded electrical signals is performed directly within the keyboard mechanism. Depression of any data or function key on the keyboard 14 will result in the generation of a six-bit binary number, four bits of which are representative of the decimal number or command associated with the depressed key. An exemplary code designation for each of the data keys and the function keys is set forth in tabular form in FIGURE 3. It is noted from FIGURE 3 that the mode generated for each key is a six bit binary number consisting of bits KB6–KB1. The bit KB6 is a "one" for all key depressions and serves as a synchronizing signal delayed somewhat with respect to the other pulses generated for a particular key depression so as to insure that the full range of signals is derived from the keyboard prior to energization of any element in the logic system. The manner in which this is accomplished will be described more fully in connection with FIGURE 4.

The pulse KB5 is a "zero" for depression of each of the data keys and a "one" for depression of each of the function keys. This bit KB5 therefore serves as a means for identifying the bits KB4–KB1 as being either data input or function commands. The bits KB4–KB1 provide the four bit binary representation of the decimal numbers and commands provided by the various keys on the keyboard. With regard to the codes assigned to the decimal numbers represented by the data keys, it is noted that the Excess–3 coded decimal system is provided directly from the keyboard by assigning to each decimal designation the binary designation corresponding to the decimal designation plus 3. In this way the binary signals generated for each decimal key depression are automatically converted into the Excess-3 code.

Figures 4, 5:
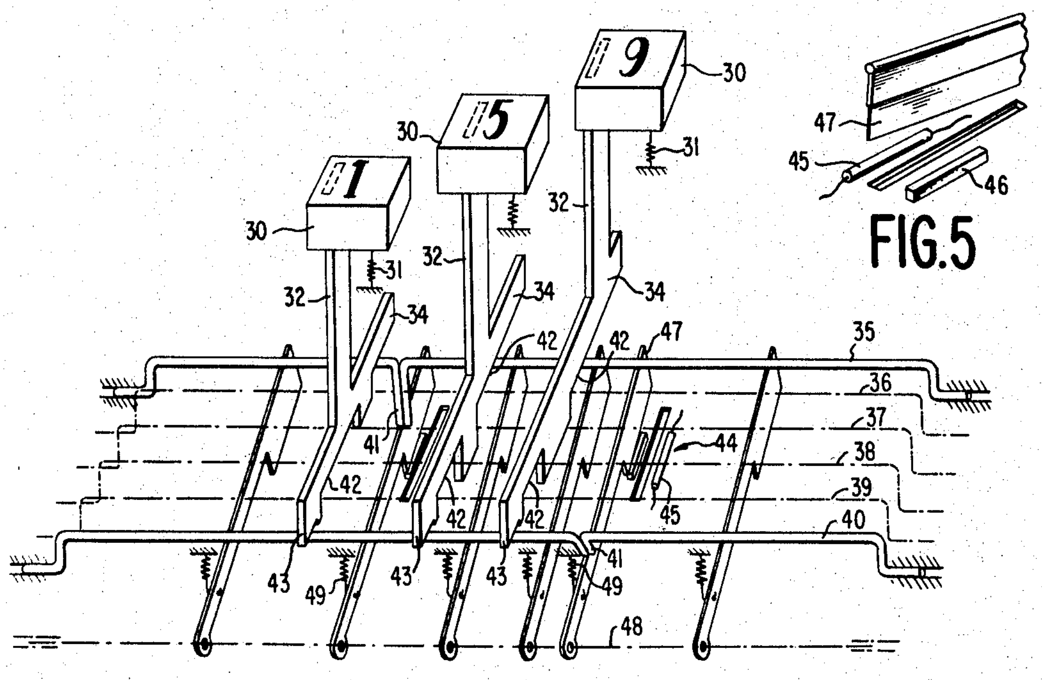
FIGURE 4 is a diagrammatic perspective view of a keyboard mechanism in accordance with the instant invention.
FIGURE 5 is a detail view of a switch unit utilized with the mechanism of FIGURE 4.

The binary coded signals representing each of the data and function keys on the keyboard are generated in the keyboard mechanism illustrated in part in FIGURE 4. Only three of the keys 16 from the keyboard are shown in FIGURE 4 so as to provide a clear and uncomplicated illustration of keyboard operation. Since the portion of the keyboard illustrated is representative of the general construction and operation of the entire keyboard, it is not believed that illustration of the entire keyboard mechanism is necessary to complete understanding thereof. The key tops 30 of each of the keys may take the appearance and touch of conventional calculators or typewriters and may be of the non-power assisted type where the total work is done by the operator depressing the key, or a power assisted keyboard may be provided in accordance with the conventional construction normally utilized in calculator or typewriter machines.

The key stem 32 depending from each of the key tops 30 is provided with an actuating member 34. Each of the actuating members 34 is normally positioned in the non-depressed position of each key slightly above and overlying a plurality of cranks 35–40 rotatably mounted within the framework of the machine (not shown). The actuating members 34 are provided with one or more cutout portions of 42 which communicate respectively with one or more of the cranks 35–40. By properly positioning the cutout portions 42 on each actuating member 34, depression of a particular key will result in actuation of a particular combination of the cranks 35–40, which combination represented by both actuated and non-actuated cranks is sufficient to establish a binary code. Since six cranks are provided, a six bit binary code can be generated by selectively operating the cranks 35–40 in the various binary combinations available.

In order to detect the various combinations of crank operation provided by the various keys on the keyboard there is associated with each crank a switch combination 44 (FIGURE 5) consisting of a normally open reed switch 45, a permanent magnet 46, and a magnetic shutter 47 pivotally mounted at 48 (FIG. 4) to the machine frame. The reed switch 45 in each switch combination 44 is a normally open, single pole single throw switch which closes when placed within the magnetic field of the permanent magnet 46. Thus, in the non-operating condition, i.e., when no key stems are depressed, the reed switches 45 are maintained in a closed condition by the permanent magnets 46 provided closely adjacent thereto. However, when a key stem 32 is depressed rotating one or more of the cranks 35–40, an extension 41 on the depressed cranks will rotate the magnetic shutter in the switch combination 44 associated with that particular crank placing the magnetic shutter into a slot positioned between the reed switch 45 and the permanent magnet 46. With the shutter in this position, the field of the permanent magnet is blocked from the reed switch allowing the contacts of the switch to open.

The depressed key stem 32 and the associated cranks are returned to the normal position by crank return springs (not shown) key stem compression springs 31 and shutter return springs 49.

To obtain correct synchronization of the detection of the binary output data generated by the keyboard there is provided a crank 40 which is actuated for each depression of a key on the keyboard so as to generate a binary "one" regardless of which key is depressed. However, in order to insure that all cranks which are to be operated in response to a key depression have rotated to the extent necessary to generate the proper electrical output for a reading of the data from the keyboard the KB6 bit generated by operation of crank 40 is delayed slightly by providing a relatively small cutout portion 43 on each of the actuating members 34. In this way, substantial rotation of the cranks 35–39 is necessary before operation of the machine will occur thereby eliminating generation of an erroneous code through premature machine operation prior to full rotation of one or more cranks.

As indicated above, FIGURE 4 illustrates only a portion of the keyboard mechanism; however, it should be understood that the remainder of the mechanism operates in a substantially identical manner as the keys illustrated. The group of keys 18 which are located on the keyboard 14 to the right of the keys illustrated in FIGURE 4 would be placed in proper position above the cranks 35–40 so as to provide actuation of these cranks producing appropriate binary signals from the switch combinations 44.

Figure 6:
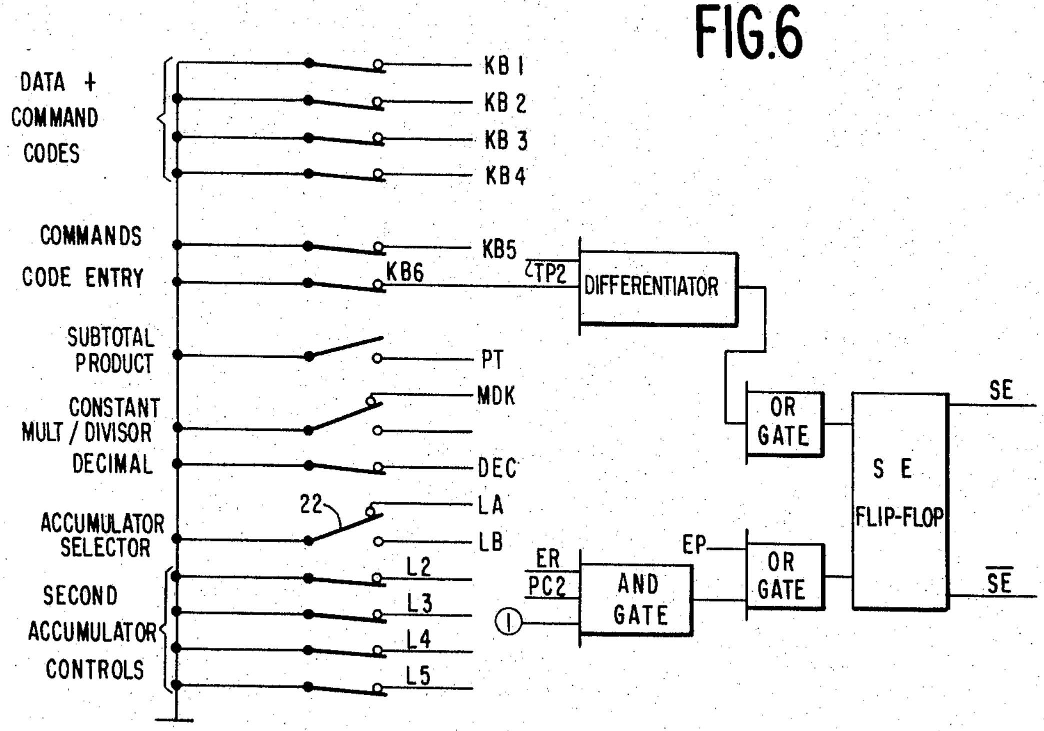
FIGURE 6 is a schematic diagram including the circuit portion of the keyboard mechanism illustrated in FIGURE 4.

FIGURE 6 illustrates a schematic diagram of the circuit controlled by the keyboard indicating that closing of a reed switch effectively grounds the particular circuit involved producing a binary "zero," while an open switch represents a binary "one." It is also apparent from FIGURE 6 that certain keys on the keyboard 14 in the command section 18, such as the subtotal product key, the constant multiplicand/divisor key, the decimal key, and the control slides 20 and 22 are simple switches providing single electrical signals indicative of the particular function selected. These output signals from the switches involved are applied through a keyboard signal forming circuit to various portions of the logic system in control thereof. The latter circuit merely forms input pulses in accordance with the state of the corresponding switches SW–1 through SW–8.

We claim:

1. A keyboard decoder mechanism for generating a binary coded electrical output in response to a manually operated keyboard input comprising key means including key stem means mounted for reciprocation between an inactive position and an operative position, means for normally biasing said key means into said inactive position, a plurality of mechanical means having first and second operative positions and normally biased into said first operative position, detecting means for detecting the position of each of said mechanical means, and actuating means connected to said key stem means for moving only selective ones of said mechanical means to their second operative position in response to movement of said key means to its operative position, each said mechanical means comprising a rotatable crank positioned in juxtaposition with said actuating members, said actuating members serving to rotate selective cranks in response to actuation of one of said keys.

2. A keyboard decoder mechanism for generating a binary coded electrical output in response to a manually operated keyboard input comprising key means including key stem means mounted for reciprocation between an inactive position and an operative position, means for normally biasing said key means into said inactive position, a plurality of mechanical means having first and second operative positions and normally biased into said first operative position, detecting means for detecting the position of each of said mechanical means, and actuating means connected to said key stem means for moving only selective ones of said mechanical means to their second operative position in response to movement of said key means to its operative position, said actuating means including an actuating member connected to each one of said keys, each actuating member having means for actuating said plurality of mechanical means in a combination representative only of its associated key, said actuating members having respective cut-out portions and actuating portions in registration with said mechanical means, each said mechanical means comprising a rotatable crank positioned in juxtaposition with said actuating members, said actuating members serving to rotate selective cranks in response to actuation of one of said keys.

3. A keyboard decoder mechanism for generating a binary coded electrical output in response to a manually operated keyboard input comprising key means including key stem means mounted for reciprocation between an inactive position and an operative position, means for normally biasing said key means into said inactive position, a plurality of mechanical means having first and second operative positions and normally biased into said first operative position, detecting means for detecting the position of each of said mechanical means, and actuating means connected to said key stem means for moving only selective ones of said mechanical means to their second operative position in response to movement of said key means to its operative position, each said mechanical means comprising a rotatable crank positioned in juxtaposition with said actuating members, said actuating members serving to rotate selective cranks in response to actuation of one of said keys, said detecting means including individual electrical switch means responsive to each one of said mechanical means to detect the position thereof.

4. A keyboard decoder mechanism for generating a binary coded electrical output in response to a manually operated keyboard input comprising key means including key stem means mounted for reciprocation between an inactive position and an operative position, means for normally biasing said key means into said inactive position, a plurality of mechanical means having first and second operative positions and normally biased into said first operative position, detecting means for detecting the position of each of said mechanical means, and actuating means connected to said key stem means for moving only selective ones of said mechanical means to their second operative position in response to movement of said key means to its operative position, each said mechanical means comprising a rotatable crank positioned in juxtaposition with said actuating members, said actuating members serving to rotate selective cranks in response to actuation of one of said keys, said detecting means including individual electrical switch means responsive to each one of said mechanical means to detect the position thereof, said electrical switch means including magnet means and reed switch means normally maintained open by said magnet means and magnetic shutter means movable to isolate said reed switch means from said magnet means thereby effecting closing of said reed switch means.

5. A keyboard decoder mechanism for generating a binary coded electrical output in response to a manually operated keyboard input comprising key means including key stem means mounted for reciprocation between an inactive position and an operative position, means for normally biasing said key means into said inactive position, a plurality of mechanical means having first and second operative positions and normally biased into said first operative position, detecting means for detecting the position of each of said mechanical means, and actuating means connected to said key stem means for moving only selective ones of said mehcanical means to their second operative position in response to movement of said key means to its operative position, each said mechanical means comprising a rotatable crank positioned in juxtaposition with said actuating members, said actuating members serving to rotate selective cranks in response to actuation of one of said keys, said detecting means including individual electrical switch means responsive to each one of said mechanical means to detect the position thereof, said electrical switch means including magnet means and reed switch means normally maintained open by said magnet means and magnetic shutter means movable to isolate said reed switch means from said magnet means thereby effecting closing of said reed switch means, said magnetic shutter means being provided for each of said mechanical means and responsive to movement of said mechanical means to said second operative position.

6. A keyboard decoder mechanism for generating a binary coded electrical output in response to a manually operated keyboard input comprising key means including key stem means mounted for reciprocation between an inactive position and an operative position, means for normally biasing said key means into said inactive position, a plurality of mechanical means having first and second operative positions and normally biased into said first operative position, detecting means for detecting the position of each said mechanical means, and actuating means connected to said key stem means for moving only selective ones of said mechanical means to their second operative position in response to movement of said key means to its operative position, said actuating means including an actuating member connected to each one of said keys, each actuating member having means for actuating said plurality of mechanical means in a combination representative only of its associated key, said actuating members having respective cut-out portions and actuating portions in registration with said mechanical means, each said mechanical means comprising a rotatable crank positioned in juxtaposition with said actuating members, said actuating members serving to rotate selective cranks in response to actuation of one of said keys, delay means associated with each of said actuating members and associated with one of said mechanical means for delaying actuation of said one mechanical means with respect to the other mechanical means upon actuation of a key means.

7. A keyboard decoder mechanism for generating a binary coded electrical output in response to a manually operated keyboard intput comprising key means including key stem means mounted for reciprocation between an inactive position and an operative position, means for normally biasing said key means into said inactive position, a plurality of mechanical means having first and second operative positions and normally biased into said first operative position, detecting means for detecting the position of each of said mechanical means, and actuating means connected to said key stem means for moving only selective ones of said mechanical means to their second operative position in response to movement of said key means to its operative position, said actuating means including an actuating member connected to each one of said keys, each actuating member having means for actuating said plurality of mechanical means in a combination representative only of its associated key, said actuating members having respective cut-out portions and actuating portions in registration with said mechanical means, each said mechanical means comprising a rotatable crank positioned in juxtaposition with said actuating members, said actuating members serving to rotate selective cranks in response to actuation of one of said keys, delay means associated with each of said actuating members and associated with one of said mechanical means for delaying actuationg of said one mechanical means with respect to the other mechanical means upon actuation of a key means, said delay means comprising a partial cut-out portion in registration with one of said cranks.

8. A keyboard decoder mechanism for generating a binary coded output in response to a manually operated keyboard input comprising a plurality of keys including key stems mounted for reciprocation between an inactive position and an operative position, said keys being normally biased into said inactive position, a plurality of rotatable cranks each movable between first and second positions representing first and second binary states, each crank being normal in said first position, an actuating member connected to each key stem of said keys in juxtaposition with said plurality of cranks, each actuating member being provided with selected cutout portions in registration with selected cranks, and detecting means associated with each crank, each detecting means being provided with a magnetic switch combination capable of detecting the state of its associated crank.

9. A keyboard decoder mechanism for generating a binary coded output in response to a manually operated keyboard input comprising a plurality of keys including key stems mounted for reciprocation between an inactive position and an operative position, said keys being normally biased into said inactive position, a plurality of rotatable cranks each movable between first and second positions representing first and second binary states, each crank being normal in said first position, an actuating member connected to each key stem of said keys in juxtaposition with said plurality of cranks, each actuating member being provided with selected cutout portions in registration with selected cranks, and detecting means associated with each crank, each detecting means being provided with a magnetic switch combination capable of detecting the state of its associated crank, said magnetic switch combinations each including magnet means and reed switch means normally maintained open by said magnet means and magnetic shutter means movable in response to actuation of its associated crank to isolate said reed switch means from said magnet means thereby effecting closing of said reed switch means.

10. A keyboard decoder mechanism for generating a binary coded output in response to a manually operated keyboard input comprising a plurality of keys including key stems mounted for reciprocation between an inactive position and an operative position, said keys being normally biased into said inactive position, a plurality of rotatable cranks each movable between first and second positions representing first and second binary states, each crank being normal in said first position, an actuating member connected to each key stem of said keys in juxtaposition with said plurality of cranks, each actuating member being provided with selected cutout portions in registration with selected cranks, and detecting means associated with each crank, each detecting means being provided with a magnetic switch combination capable of detecting the state of its associated crank, said magnetic switch combination each including magnet means and reed switch means normally maintained open by said magnet means and magnetic shutter means movable in response to actuation of its associated crank to isolate said reed switch means from said magnet means thereby effecting closing of said reed switch means, said magnetic shutter means being provided with biasing means for normally maintaining said shutter means in an inoperative position remote from said switch means.

11. A keyboard decoder mechanism for generating a binary coded output in response to a manually operated keyboard input comprising a plurality of keys including key stems mounted for reciprocation between an inactive position and an operative position, said keys being normally biased into said inactive position, a plurality of rotatable cranks each movable between first and second positions representing first and second binary states, each crank being normal in said first position, an actuating member connected to each key stem of said keys in juxtaposition with said plurality of cranks, each actuating member being provided with selected cutout portions in registration with selected cranks, and detecting means associated with each crank, each detecting means being provided with a magnetic switch combination capable of detecting the state of its associated crank, delay means associated with each actuating member for delaying actuation of one of said cranks with respect to the others upon actuation of any key.

12. A keyboard decoder mechanism for generating a binary coded output in response to a manually operated keyboard input comprising a plurality of keys including key stems mounted for reciprocation between an inactive position and an operative position, said keys being normally biased into said inactive position, a plurality of rotatable cranks each movable between first and second positions representing first and second binary states, each crank being normal in said first position, an actuating member connected to each key stem of said keys in juxtaposition with said plurality of cranks, each actuating member being provided with selected cutout portions in registration with selected cranks, and detecting means associated with each crank, each detecting means being provided with a magnetic switch combination capable of detecting the state of its associated crank, delay means associated with each actuating member for delaying actuation of one of said cranks with respect to the others upon actuation of any key, said delay means comprising a partial cutout portion on each actuating member in registration with a common crank.

13. A keyboard decoder mechanism for generating a binary coded output in response to a manually operated keyboard input comprising a plurality of keys including key stems mounted for reciprocation between an inactive position and an operative position, said keys being normally biased into said inactive position, a plurality of rotatable cranks each movable between first and second positions representing first and second binary states, each crank being normal in said first position, an actuating member connected to each key stem of said keys in juxtaposition with said plurality of cranks, each actuating member being provided with selected cutout portions in registration with selected cranks, and detecting means associated with each crank, each detecting means being provided with a magnetic switch combination capable of detecting the state of its associated crank, register means connected to each of said switch combinations for generating a binary code representative of the open and closed state of said switch combinations.

14. A keyboard decoder mechanism for generating a binary coded output in response to a manually operated keyboard input comprising a plurality of keys including key stems mounted for reciprocation between an inactive position and an operative position, said keys being normally biased into said inactive position, a plurality of rotatable cranks each movable between first and second positions representing first and second binary states, each crank being normal in said first position, an actuating member connected to each key stem of said keys in juxtaposition with said plurality of cranks, each actuating member being provided with selected cutout portions in registration with selected cranks; and detecting means associated with each crank, each detecting means being provided with a magnetic switch combination capable of detecting the state of its associated crank, register means connected to each of said switch combinations for generating a binary code representative of the open and closed state of said switch combinations, said register means including a plurality of flip-flops and an "and" gate matrix connected to the output of said flip-flops, said switch combinations serving to set or reset a respective flip-flop in said register in accordance with its closed or open condition respectively.

15. A keyboard decoder mechanism for generating a binary coded output in response to a manually operated keyboard input comprising a plurality of keys including key stems mounted for reciprocation between an inactive position and an operative position, said keys being normally biased into said inactive position, a plurality rotatable cranks each movable between first and second positions representing first and second binary states, each crank being normal in said first position, an actuating member connected to each key stem of said keys in juxtaposition with said plurality of cranks, each actuating member being provided with selected cutout portions in registration with selected cranks, and detecting means associated with each crank, each detecting means being provided with a magnetic switch combination capable of detecting the state of its associated crank, said magnetic switch combinations each including magnet means and reed switch means normally maintained open by said magnet means and magnetic shutter means movable in response to actuation of its associated crank to isolate said reed switch means from said magnet means thereby effecting closing of said reed switch means, delay means associated with each actuating member for delaying actuation of one of said cranks with respect to the others upon actuation of any key, said delay means comprising a partial cutout portion on each actuating member in registration with a common crank, register means connected to each of said switch combinations for generating a binary code representative of the open and closed state of said switch combinations, said register means including a plurality of flip-flops and an "and" gate matrix connected to the output of said flip-flops, said switch combinations serving to set or reset a respective flip-flop in said register in accordance with its closed or open condition respectively.

References Cited

UNITED STATES PATENTS

| | | | |
|---|---|---|---|
| 2,861,262 | 11/1958 | Pankove | 340—365 |
| 2,997,703 | 8/1961 | Powell | 235—145 |
| 3,201,537 | 8/1965 | Klattle et al. | 200—61.41 |

MAYNARD R. WILBUR, *Primary Examiner.*

J. GLASSMAN, *Assistant Examiner.*

U.S. Cl. X.R.

235—145; 340—365